United States Patent [19]

Reinmold et al.

[11] 4,422,149
[45] Dec. 20, 1983

[54] PROCESS AND APPARATUS FOR THE CORRECTION OF THE CONTROL PROGRAM OF AN AUTOMATIC GLASS SHEET CUTTING MACHINE

[75] Inventors: Heinz-Josef Reinmold; Horst Mücha; Wilhelm Arnoldi, all of Aachen, Fed. Rep. of Germany

[73] Assignee: Saint Gobain Vitrage, Neuilly-sur-Seine, France

[21] Appl. No.: 224,948

[22] Filed: Jan. 14, 1981

[30] Foreign Application Priority Data

Jan. 21, 1980 [DE] Fed. Rep. of Germany ....... 3001954

[51] Int. Cl.³ .................. G06F 15/46; G05B 19/18
[52] U.S. Cl. .................. 364/473; 318/568; 318/572; 364/170; 364/191; 364/475; 377/17
[58] Field of Search .............. 364/473, 476, 474, 475, 364/191, 192, 193, 167, 170, 171; 318/568, 572, 632, 570, 574, 576, 577, 578, 603, 162; 235/92 MP; 33/1 M; 377/16, 17

[56] References Cited

U.S. PATENT DOCUMENTS

| | | | |
|---|---|---|---|
| 3,473,157 | 10/1969 | Little et al. | 364/900 |
| 3,490,147 | 1/1970 | Brichard et al. | 364/475 X |
| 3,491,278 | 1/1970 | Stobbe | 318/572 |
| 3,585,372 | 6/1971 | Bell et al. | 318/572 |
| 3,594,563 | 7/1971 | Bishop | 364/170 |
| 3,612,840 | 10/1971 | Stobbe | 364/170 X |
| 3,626,266 | 12/1971 | Sindelar et al. | 318/572 |
| 3,764,775 | 10/1973 | Hasslinger et al. | 364/170 X |
| 3,911,347 | 10/1975 | Hartung | 318/632 |
| 4,099,113 | 7/1978 | Hayashi | 364/170 X |

*Primary Examiner*—Joseph F. Ruggiero
*Attorney, Agent, or Firm*—Pennie & Edmonds

[57] ABSTRACT

Method for correcting the control program of an automatic glass cutting machine including the steps of adding in counters signal pulses representative of travel of a scanning head in X and Y directions, checking the counter totals at the starting and end points of travel of the scanning head and introducing pulses in the program to bring the counter totals to a zero value. A device for correcting the control program of an automatic glass cutting machine having counters for adding signal pulses representative of travel of a scanning head in X and Y directions and a pulse generator for each counter which may put a required number of pulses into memory to bring the total count in the counters to zero at the completion of travel of the scanning head.

6 Claims, 3 Drawing Figures

PROCESS AND APPARATUS FOR THE CORRECTION OF THE CONTROL PROGRAM OF AN AUTOMATIC GLASS SHEET CUTTING MACHINE

TECHNICAL FIELD

This invention relates to a method and device for correcting the control program of an automatic glass sheet cutting machine and more particularly a program for pulse guidance of a glass cutting machine along a path defined in Cartesian X and Y coordinates.

BACKGROUND OF THE INVENTION

Automatic glass cutting machines have been proposed which utilize a scanning head equipped with an emitter of X pulses representing the X coordinates of the various points on a pattern and an emitter of Y pulses representing the Y coordinates of the various points on a pattern representing the outline to be cut and where the scanning head is guided along the pattern to register a program. These X and Y pulses constitute signals representing the outline to be cut and they are stored in memory. Thereafter, the memory need only be recalled in order to control the cutting machine.

Published French patent application No. 2,367,710 describes such a glass sheet cutting machine controlled by a magnetic tape carrying information on the X and Y coordinates of the various points on the outline to be cut. A similar cutting machine of this type may also be used to record the cutting program on the magnetic tape and is described in German patent application No. 2,646,053.

U.S. patent application 092,972 filed Nov. 9, 1979 Pat. No 4,325,188 describes a device for recording a cutting program intended for such a cutting machine. In such a device, the scanning head follows the outline of a pattern with the aid of a sensor. Theoretically, when the scanning head has traversed the entire outline of the pattern, it will have returned to the point it started from when beginning the scanning operation. In practice, whether the scanning head is run manually or automatically controlled, this is not quite true, and there is a slight discrepancy between the starting point and the end point of the scan. If the starting point, or zero point, is not precisely reached after the scan, this will be reflected in the recorded program by a deviation between the starting index and the target index. When the recorded program is operated to guide the cutting machine, this slight deviation is represented, on a cut sheet taken individually, by an insignificant jog in the cut, on the order of 0.1 mm, and not even noticeable to the naked eye. But since the target point of the cutting head is at the same time its starting point for the next cut, these discrepancies accumulate with each operation of cutting another sheet of glass, so that eventually the cutting tool is carried beyond the edges of a sheet of glass out of which a part is to be cut.

It is therefore an object of our invention to provide a method and a device for correcting the control program of an automatic glass cutting machine so that in the recorded program, the index corresponding to the starting point of a closed line of cut is exactly the same as the index corresponding to the target point after the line of cut has been traversed.

GENERAL DESCRIPTION OF THE INVENTION

Broadly our invention involves a method by which path signals in the form of pulses, positive or negative according as the scanning head is traveling in the positive or negative directions on the coordinate X and Y axes in traversing the cut outline of the pattern are added in separate X and Y counters, the counter totals are checked at the starting point and target point of the scanning head, a required number of pulses are added to the program so that the counter totals will be identical at the beginning and end of the path of the scanning head.

Thus the invention departs from the method previously followed, which was to find the zero point by means of the scanning head. Instead, X and/or Y discrepancies between the starting position and the end position of the exploring head are now accepted, and the recorded program is corrected at the memory level by putting in additional pulses with the aid of pulse emitters. This method serves to avoid the use of a high precision program machine which would be very costly.

Broadly a device according to the invention essentially comprises, besides an electronic pulse memory means, certain adding pulse counters, one for pulses controlling motion along the X axis and another for pulses controlling motion along the Y axis, and additional pulse generators adapted to be actuated at the end of the recording of the program when a scanning head is at its target point if the counts shown by each counter are different from the counts shown by the same counters before recording when the scanning head was at its starting point.

The device may be designed for manual operation. In this case, the missing control pulses are supplied manually, the number indicated by the reading of the counter with a negative or positive sign also being indicated by the counter.

According to one especially advantageous embodiment of the invention, an automatic zero point finding circuit is proposed, in the form of a logic circuit combined with the recording circuit. In this preferred embodiment, no manual intervention is required, the device itself automatically supplementing the cutting program with any number of signals still missing in order to re-attain the readings of the counters at the starting point of the scanning head.

DESCRIPTION OF THE PREFERRED EMBODIMENTS

Figure 1:
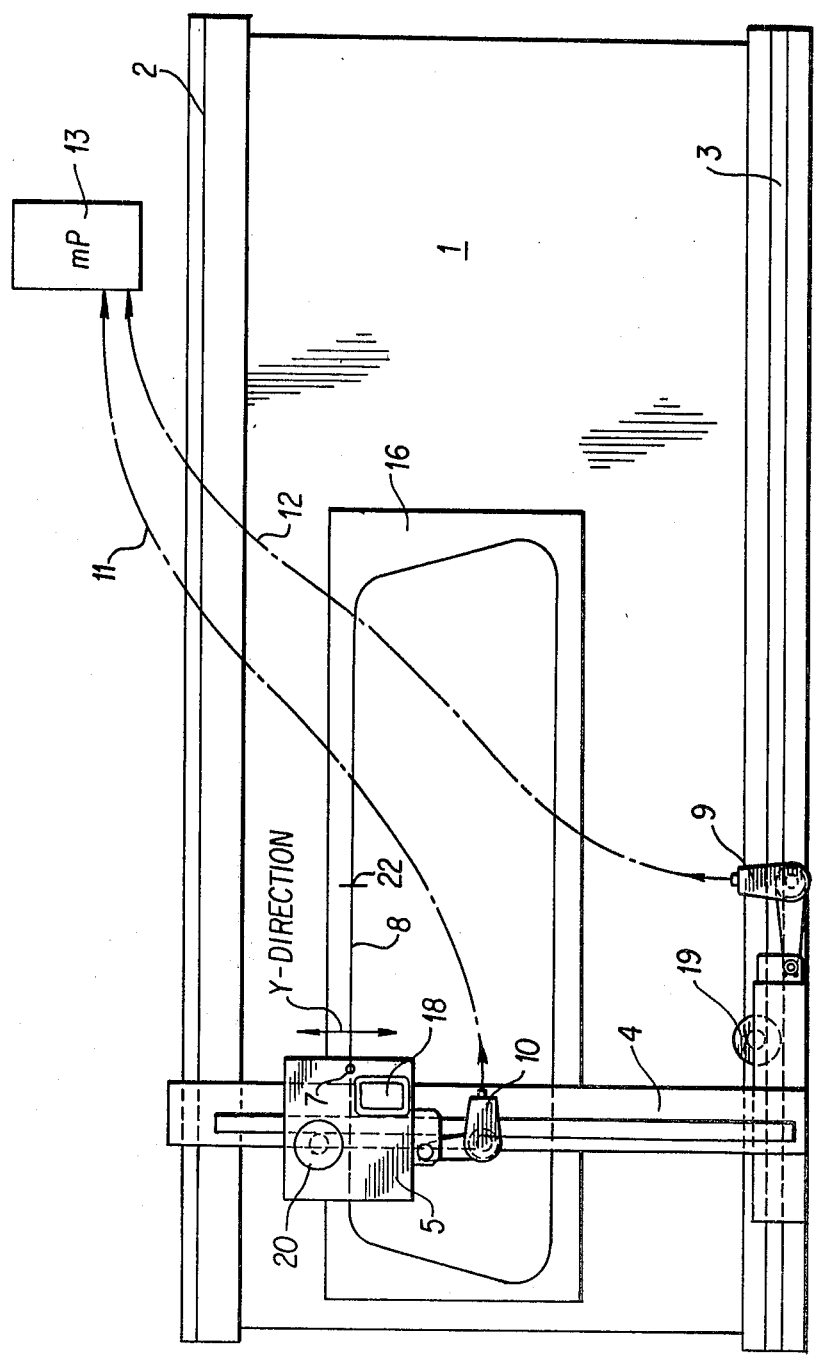
FIG. 1 is a schematic drawing of a cutting program recording device constructed according to the invention.

Referring to FIG. 1, there is illustrated the mechanical portion of a cutting program recording device having a platform 1 with rails 2 and 3 arranged on the two lengthwise sides of the platform. The rails support a bridge 4 capable of traveling along the rails in the X direction. The bridge 4 in turn supports a carriage 5 capable of traveling along the bridge in the Y direction.

A scanning head 7 is mounted on the carriage and is adapted to be guided along the path 8 which is to be programmed. The motion imparted by the carriage 5 is transmitted to two rotatable pulse emitters 9 and 10. The pulses supplied by the emitters 9 and 10 are signals representing the pattern path along which the scanning head is made to travel. These signals are transmitted to an electronic storage or memory means 13 by lines 11 and 12.

The memory means 13 comprises a recording microprocessor and a magnetic tape recorder which constitutes the memory proper. The function of the recording microprocessor is to convert the signals coming from the pulse emitters into signals stored on magnetic tape which can then be read by a magnetic tape reader when the program is executed to cut sheets of glass.

The path 8 corresponds to the shape of the piece to be cut out of sheets of glass, and it may be a line drawn, for example, on bristol board. The carriage 5 may be guided manually along the path 8, but it is also possible to provide an automatic control for the travel of the carriage along the path.

Such an automatic control is schematically represented in FIG. 1 and it comprises a following means 18 provided on the carriage 5, a drive motor 19 to propel the bridge 4 in the X direction, and a drive motor 20 to propel the carriage in the Y direction, that is, along the bridge 4. The two drive motors 19 and 20 are equipped with pinions meshing with racks arranged parallel to the rails 3 and 4.

A reference point 22, readable by the scanning head, is located on the path 8 and represents the beginning of the scanning head path 8 and the start of the recorded program. The reference point 22 at the same time represents the end point of the path of the scanning head and serves to instruct the scanning head to stop its travel at the end of the recorded program.

Figure 2:
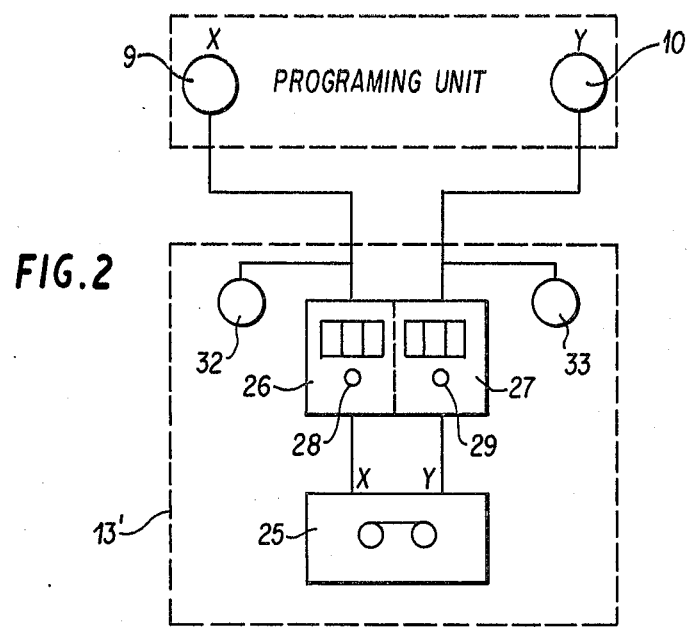
FIG. 2 is a diagram of an electronic circuit utilized in the device of FIG. 1 for manually carrying out the correction procedure; and, FIG. 3 is a diagram of an electronic circuit for the automatic correction of the cutting program of the device of FIG. 1.

Referring to FIG. 2, it is seen that signals from the pulse emitter 9 for the X direction are carried to a memory 25 of the memory means 13' consisting of a recording microprocessor and a magnetic tape recorder. The signals also are carried to a differential counter 26, having two directions of counting, that is capable of counting up or down. If for example some signals are positive pulses and some signals are negative pulses, these pulses of unlike sign are added. Likewise, the signals from pulse emitter 10 for the Y direction are carried to a two-way differential counter 27.

At the starting point 22 of the scanning head, that is, before the scanning of the path 8 begins, the two counters 26, 27 are at zero. When the scanning head is started, according to the direction of rotation of the two pulse emitters 9, 10, positive or negative pulses are introduced into the memory 25 and into counters 26 and 27. Inasmuch as the counters 26 and 27 are adding counters, necessarily once path 8 has been traversed, if the starting point has been exactly re-attained, a zero reading will again appear as the sum of all the pulses on each counter for the X direction and the Y direction alike. However, in practice, there will generally be some pulses too many or too few in one direction or the other, so that some positive or negative value remains in each counter, for example five pulses or so, corresponding to a travel of the scanning head of about 0.1 mm. The indexes 28 and 19 indicate whether the deviations are positive or negative.

A pulse generator 32 paralleling the pulse emitter 9 for the X direction is provided as well as an independent pulse generator 33 paralleling the pulse emitter 10 for the Y direction. These pulse generators 32 and 33, like the pulse emitters 9 and 10, are capable of providing positive and negative pulses. If, when the path 8 has been completely traversed, a positive signal remains in counter 26, the pulse generator 32 is set and actuated manually to provide negative pulses, and remains in action until the value zero appears in counter 26. Then the same operation is accomplished for the Y direction by actuating the pulse generator 33 if a value different from zero remains in counter 27.

Figure 3:
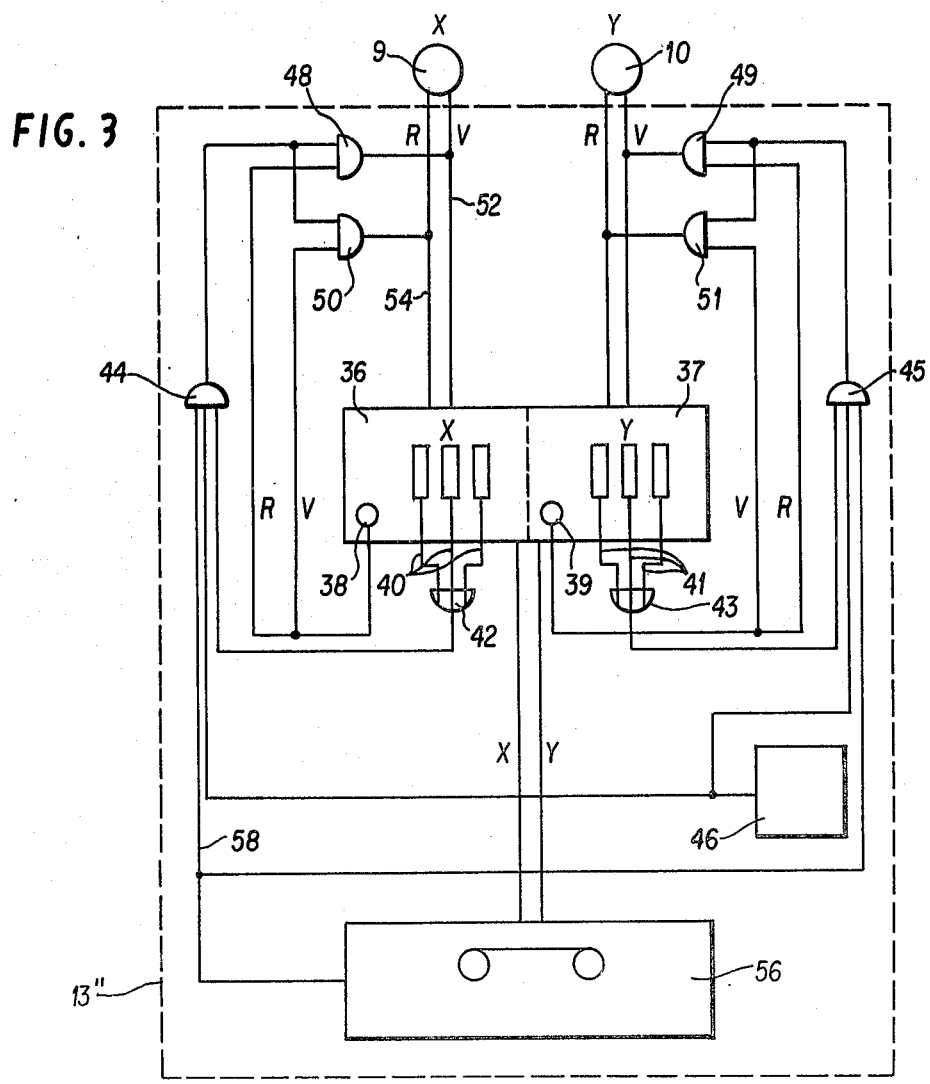

In the automatic starting point finder circuit represented in FIG. 3, a two-way adding counter 36 is again provided in the memory means 13" for the X direction and another counter 37 for the Y direction. The two counters 36 and 37 are indicated as having three decades and each includes a logic circuit to recognize the sign of the value found and indicate it in the displays 38 and 39. If for example a value different from zero remains in one decade of counter 36, that value corresponds to a voltage signal. This voltage signal is transmitted by line 40 to an OR gate 42. The output of the OR gate 42 is then applied to the input of a first AND gate 44. The second input of this AND gate 44 is connected to pulse generator 46. The output of the AND gate 44 is connected to the inputs of a second AND gate 48 and a third AND gate 50. The AND gate 48 provides negative pulses on the line 52, while the AND gate 50 transmits positive pulses to line 54. The other input of the two AND gates 48, 50 is connected to the display 38 of counter 36. This display 38 emits a recognition signal indicating whether the value indicated by the counter is a positive or a negative value. If the indicated numerical value is for example positive, the AND gate is thus open. Then the signals provided by the pulse generator 46 are transmitted by way of the AND gate 48 to line 52 with the result that first, the counter 36 is reset to zero and second, that the program recorded in the memory 56 is supplemented with additional signals.

As soon as counter 36 reaches a value of zero, the lines 40 are deprived of voltage so that the AND gate 44 is blocked. This means that the process of correction in the X circuit has been completed. The third input line 58 of the AND gate 44 is connected to the magnetic recording system of the memory 56. Then the AND gate 44 and hence the electronic zero finding circuit as a whole are open only if the process of recording or programming, is completed, because the complete path 8 has been traversed.

The combination logic circuit acting on the Y direction operates in the same manner, this circuit comprising an OR gate 43 supplied with the voltages prevailing in counter 37, a first AND gate 45 following, and a second and third AND gates 49 and 51. The process of correction in the Y circuit proceeds simultaneously with the process of correction in the X circuit. As soon as the two AND gates 44 and 45 have been blocked, the two counters 36 and 37 indicate a value of zero, and the entire process of correcting the program stored in memory 56 has been completed.

We claim:

1. Method for correcting the control program of an automatic glass cutting machine where said machine has a scanning head equipped with an X-pulse emitter and a Y-pulse emitter adapted to be guided along a closed path defined in Cartesian X and Y coordinates representing a line along which glass sheet is to be cut and has a memory for storing the signals emitted by the emitters, comprising the step of adding the signals emitted by the emitters in an X counter and in a Y counter in the form of positive or negative pulses according to whether the scanning head moves in the positive or negative direction of the X and Y axes when moving along the closed path, the step of comparing the total number of pulses in each counter at the initial starting point of the movement of the recording head about the closed path with the total number of signals in each counter at the termination point of the movement of the head about the closed path, and the step of adding to the program the required number of pulses to make the number of pulses in each counter at the end of the movement of the head about the closed path equal to the number in each counter at the initial start of movement of the head about the closed path.

2. A device for correcting the control program of an automatic glass cutting machine where said device has a scanning head, a carriage supporting the scanning head slidable parrallel to an X axis and to a Y axis to move along a portion of a cutting outline in a closed path, an X axis pulse emitter on said head adapted to emit positive or negative pulses as said head moves in a positive or negative direction with respect to the X axis, a Y axis pulse emitter on said head adapted to emit positive or negative pulses as said head moves in a positive or negative direction with respect to said Y axis, and an electronic storage means; characterized in that said storage means includes an X pulse adding counter, a Y pulse adding counter, and a pulse generator for each said counter which at the end of travel of the scanning head about said closed path adds a required number of pulses to memory to make the counter total of each counter at the initial start of the scanning head about the closed path and before commencement of further travel of said scanner head about the closed path.

3. A device according to claim 2 whereby said pulse generator is manually actuated.

4. A device according to claim 2 where at the end of the movement of said scanning head about the closed path, the pulse generator is controlled by the count remaining in its associated counter.

5. A device according to claim 4 wherein said storage means includes for each counter a logic circuit having an OR gate supplied with a voltage signal corresponding to the reading of the counter, the output of said OR gate connected to one input of a first AND gate a second input of which is connected to the pulse generator, the output of said first AND gate being applied to second and third AND gates the other inputs of which receive a negative or positive signal from the counter.

6. A device according to claim 5 wherein a third input of the first AND gate is connected to a recording system.

* * * * *